April 9, 1935.  A. G. ZIMMERMAN  1,996,783
OSCILLOGRAPH GALVANOMETER
Filed Dec. 30, 1933   2 Sheets-Sheet 1

INVENTOR
ARTHUR G. ZIMMERMAN
BY
ATTORNEY

April 9, 1935.  A. G. ZIMMERMAN  1,996,783
OSCILLOGRAPH GALVANOMETER
Filed Dec. 30, 1933   2 Sheets-Sheet 2

INVENTOR
ARTHUR G. ZIMMERMAN
BY
ATTORNEY

Patented Apr. 9, 1935

1,996,783

UNITED STATES PATENT OFFICE 1,996,783

OSCILLOGRAPH GALVANOMETER

Arthur G. Zimmerman, Westmont, N. J., assignor to Radio Corporation of America, a corporation of Delaware Application December 30, 1933, Serial No. 704,808

8 Claims. (Cl. 171—95)

This invention relates to galvanometers, and more particularly to the type of galvanometers used in film sound recording apparatus.

The galvanometer is specifically intended for use in sound recording cameras wherein the sound is recorded directly on the picture film such, for example, as that disclosed in application of Russell P. May, Serial No. 670,417, filed May 11, 1933, and in an application of C. N. Batsel, Serial No. 704,655, filed December 30, 1933.

The aforesaid applications involve a sound recording device wherein a movable mirror is actuated directly by a diaphragm to record sound upon film. The galvanometer of this invention is intended to be substituted for such mirror and diaphragm when electrical operation is desired, or it may be built into or attached to any other type of film sound recorder.

Heretofore, it has been customary to adjust the position of a beam of light from a galvanometer on a soundtrack by adjustment of the galvanometer mechanism itself. In some cases, adjustment in one or more planes was secured by bodily adjustment of the galvanometer casing. In compact portable apparatuses, such as those of the beforementioned applications, however, the galvanometer must be rigidly attached to and housed within the casing of the apparatus, and hence relative movement of the galvanometer casing and the film or optical system is impossible. In apparatus made according to my invention, I use galvanometer mechanism of the type shown in Dimmick Patent 1,936,833 issued November 28, 1933, and adjustment of the mirror in relation to the remainder of that portion of the apparatus is accordingly impractical. I have accordingly devised a novel structure for mounting the galvanometer mechanism which provides for adjustment therein in different planes.

One object of the invention is to provide means for rigidly securing a galvanometer to sound recording mechanism.

Another object of my invention is to provide means for completely enclosing the galvanometer with the sound recording mechanism.

Another object of my invention is to provide means for adjustably supporting the galvanometer mechanism in relation to the sound recording mechanism.

Another object of my invention is to provide means for adjusting the entire galvanometer mechanism about the mirror thereof as a center, whereby the adjustment will not displace the mirror from the optical axis.

Another object of my invention is to provide such a device which can be readily attached to or detached from a sound recording camera.

In such apparatus as this galvanometer is intended for use in connection with, the galvanometer is attached to the rear of the apparatus, and the mirror thereof faces toward the front. In the following specification, reference to the "front" or "back" of the apparatus are used in a corresponding sense.

Figure 4:
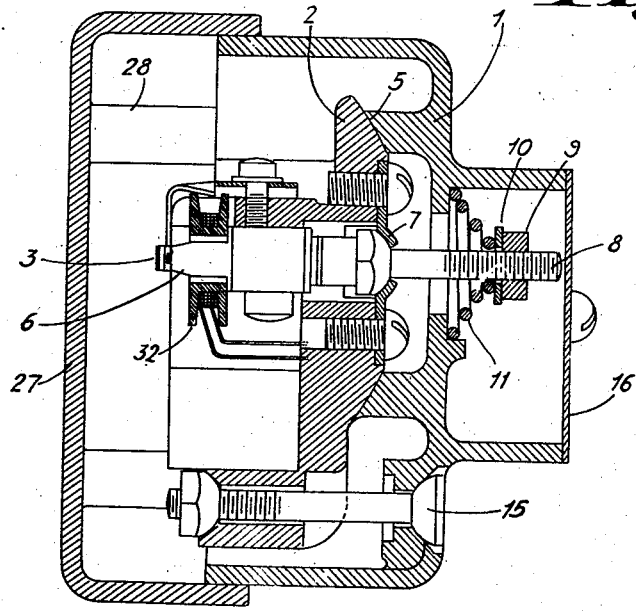
Fig. 4 is a vertical section through the galvanometer immediately adjacent to the vibrating armature.

As shown in the drawings, the galvanometer is housed in, and supported by, the casing or base member 1 which is provided with appropriate bolt-holes 4 for the purpose of attachment to the sound recorder. The interior of the member 1 is provided with a spherically curved surface 5 which serves as a seat for the correspondingly spherically curved base of the galvanometer 2. The galvanometer is provided with a mirror 3 which is vibrated by the armature 6 in response to audio frequency impulses, and the spherical surface 5 has the center of the said mirror as its center of curvature. The armature 6 vibrates between the pole pieces 30 and 31 when influenced by currents passing through the coil 32 which surrounds the armature and lies partly within the pole pieces as shown in Fig. 4.

It will be apparent that any movement of the galvanometer on the seat 5 will cause a rotation of the mirror 3 about its own center, but will cause no other positional displacement of the mirror.

Attached to the base 2 of the galvanometer is a plate 7 provided with a curved seat for the head of the bolt 8. This bolt 8 passes through the base 1 of the galvanometer, and adjacent its other end carries the nut 9 and washer 10. The washer 10 is pressed by the nut 9 against the coil spring 11 which in turn presses against the base member 1 of the galvanometer. It will be apparent that the pressure of the spring 11 produces a longitudinal tension of the bolt 8, and thereby holds the base of the galvanometer 2 firmly against the curved surface 5. Adjustment of the mirror about a vertical axis is accomplished from the exterior of the casing 1 by the large nut 12. This nut works upon the spherically headed bolt 13 which passes through one side of the galvanometer. When the nut 12 is tightened on the bolt, it accordingly pulls that side of the galvanometer toward the base member 1 and thereby adjusts the mirror in that direction about a vertical axis. Movement in the reverse direction is accomplished by the spring 14 placed between the base member 1 and the galvanometer 2, and surrounding the bolt 13. It will be apparent that if the nut 12 is loosened, the spring 14 will force the corresponding side of the galvanometer outwardly, keeping it solidly against the head of the bolt 13 and effecting corresponding rotation of the galvanometer about a vertical axis.

Figure 1:
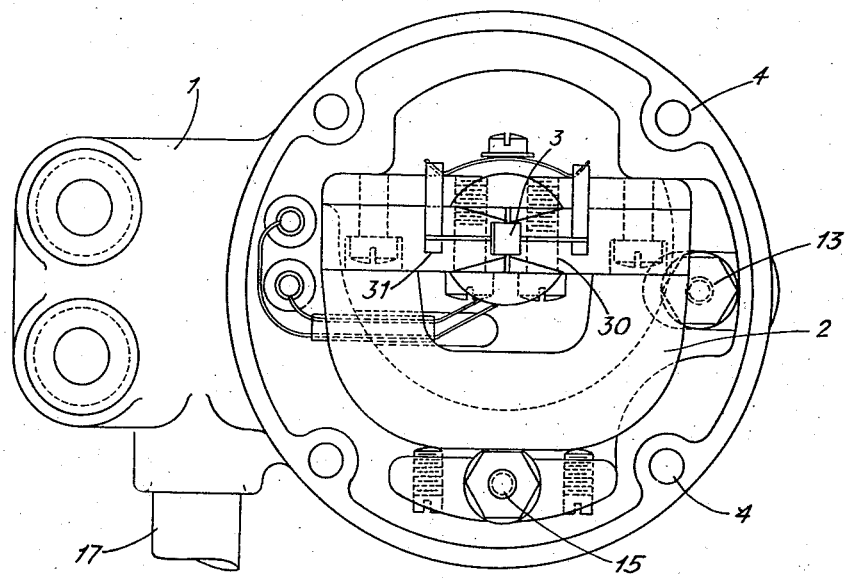
Fig. 1 is a front view of the galvanometer mechanism.
Figure 2:
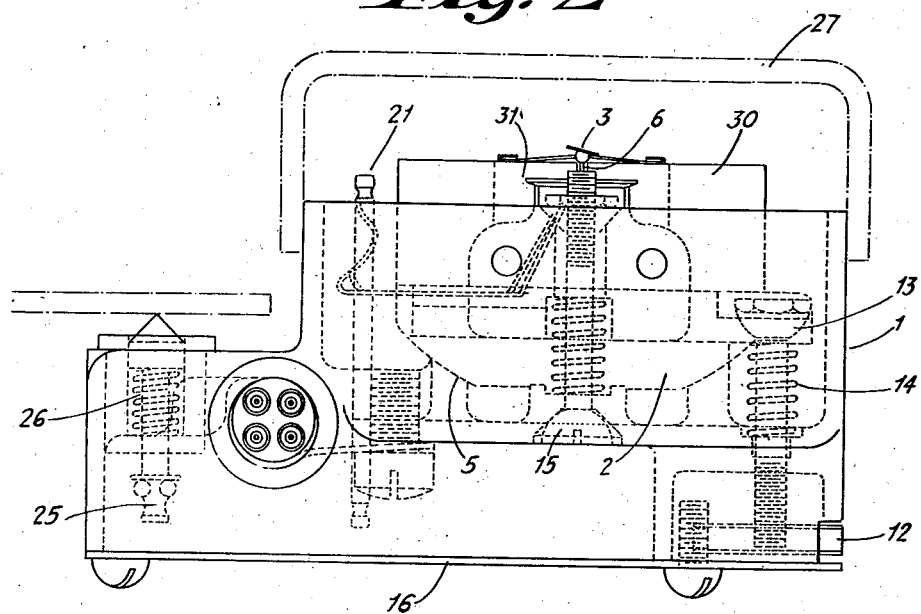
Fig. 2 is a view of the galvanometer looking up from beneath.
Figure 3:
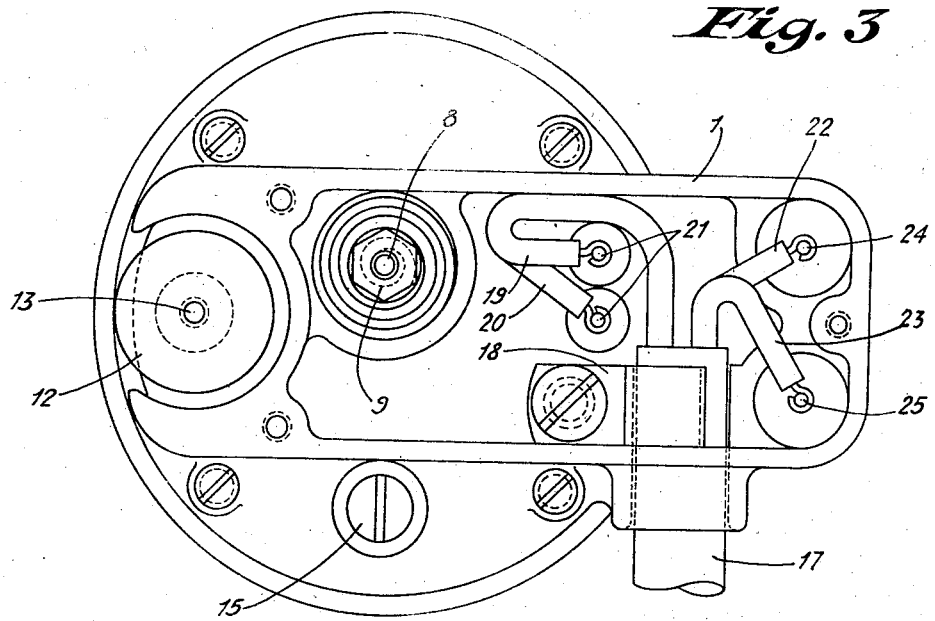
Fig. 3 is a rear view of the galvanometer with the cover plate removed.

Corresponding adjustment of the galvanometer about a horizontal axis is accomplished by the screw 15 which operates in the same way. As shown in Figs. 2 and 3, the screw 15 is not provided with a large nut, but is provided with a slotted head permitting its adjustment to be performed with the assistance of a screwdriver or coin, as the adjustment about a horizontal axis needs to be performed but rarely; whereas the adjustment about the vertical axis must be quite precise and accordingly must be performed often.

The bolt 8, after passing through the member 1, extends into a rear compartment of the member 1, and this rear compartment is closed by a cover 16 shown in Figs. 2 and 4 but removed in Fig. 3.

This compartment performs a number of other functions in addition to covering the bolt 8 with its attendant mechanism. As shown in Fig. 2, the cover 16 also serves as a protector for the nut 12.

A supply cable 17 is provided which carries current from the output of the amplifier to the galvanometer in order to actuate the mirror, and also supplies current to the exciter lamp of the recorder. This cable, as shown in Fig. 3, passes up through the bottom of the rear compartment of the member 1 and is secured by a clamp 18, thereby providing a mechanically strong and substantially storm-proof joint. Two of the conductors of this cable 19 and 20 carry the current from the amplifier through the rods 21 to the galvanometer coil. A second pair of conductors 22 and 23 in this same cable carry battery current to the rods 24 and 25. These latter rods, as shown in Fig. 2, are provided with pointed-contact ends and are pressed toward the recorder mechanism by the springs 26. When the galvanometer is secured into place on the recorder, the ends of the rods 24 and 25 are therefore firmly pressed against coresponding contacts on the recorder case to which they transmit the exciter lamp current.

A cover 27, having the spacing ribs 28 built integral therewith, may be provided for protecting the galvanometer from dirt and mechanical damage during transportation, and this cover may be secured to the galvanometer by the same screws ordinarily used for attaching the galvanometer to the recorder or camera.

Having thus described my invention, I claim:

1. A galvanometer comprising a base member having a spherically concave face, a second base member carrying the galvanometer mechanism and having a spherically convex face, and means for yieldably maintaining said spherical faces in contact with each other.

2. A galvanometer comprising a base member having a spherically concave face, a second base member carrying the galvanometer mechanism and having a spherically convex face, means for yieldably maintaining said spherical faces in contact with each other, and means for moving said second base member in relation to said first base member.

3. A mirror galvanometer comprising a base member having a spherically concave face, a second base member carrying the galvanometer mechanism and having a spherically convex face with the mirror located at the center of curvature of said face, and means for yieldably maintaining said spherical faces in contact with each other.

4. A mirror galvanometer comprising a base member having a spherically concave face, a second base member carrying the galvanometer mechanism and having a spherically convex face with the mirror located at the center of curvature of said face, means for yieldably maintaining said spherical faces in contact with each other, and means for moving said second base member in relation to said first base member.

5. A galvanometer comprising a base member having a spherically concave face, a second base member carrying the galvanometer mechanism and having a spherically convex face, means for yieldably maintaining said spherical faces in contact with each other, and means for moving said second base member about its center of curvature in relation to said first base member.

6. A mirror galvanometer comprising a base member having a spherically concave face, a second base member carrying the galvanometer mechanism and having a spherically convex face with the mirror located at the center of curvature of said face, means for yieldably maintaining said spherical faces in contact with each other, and means for moving said second base member about its center of curvature in relation to said first base member.

7. A sound recording galvanometer comprising a casing adapted to be rigidly attached to a recorder casing, galvanometer mechanism including means producing a magnetic field and vibratable means in said field within said casing, and means for adjusting the entire galvanometer mechanism in relation to said casing.

8. An oscillograph galvanometer comprising a casing adapted to be attached to a recording device, galvanometer mechanism within said casing, and a separate closed compartment in said casing carrying electrical connections for said galvanometer whereby said galvanometer is protected from external atmospheric conditions.

ARTHUR G. ZIMMERMAN.